United States Patent [19]

Gunder

[11] Patent Number: 5,445,190
[45] Date of Patent: Aug. 29, 1995

[54] GATE VALVE ACTUATOR

[76] Inventor: James A. Gunder, 13693 McGuire, Taylor, Mich. 48180

[21] Appl. No.: 276,602

[22] Filed: Jul. 18, 1994

[51] Int. Cl.⁶ .......................... F16K 3/00; B60R 15/00
[52] U.S. Cl. ................................. 137/899; 4/323; 251/229; 251/279; 251/291; 251/329
[58] Field of Search ........................ 4/323; 137/899; 251/144, 213, 299, 291, 326, 327, 229, 329; 74/20, 25, 89

[56]  References Cited

U.S. PATENT DOCUMENTS

| | | | |
|---|---|---|---|
| 1,801,237 | 4/1931 | Hanson | 251/250 |
| 3,316,929 | 5/1967 | Milette | 137/270 |
| 3,333,814 | 8/1967 | Sargent | 251/326 |
| 3,352,535 | 11/1967 | Power | 251/326 |
| 3,941,349 | 3/1976 | Pierson | 251/100 |
| 4,202,527 | 5/1980 | Price et al. | 251/279 |
| 4,523,339 | 6/1986 | Lavoie | 251/326 |
| 4,875,504 | 10/1989 | Nicholson | 137/899 |
| 5,056,544 | 10/1991 | Stevens | 251/326 |
| 5,078,180 | 1/1992 | Collins | 137/899 |

*Primary Examiner*—George L. Walton
*Attorney, Agent, or Firm*—Charles W. Chandler

[57] ABSTRACT

A manual actuator is attached to a conventional gate valve commonly used in the drainage line of a recreational vehicle. The actuator includes a handle connected to a pair of links which expand to open the valve or are folded to close the valve by turning the actuator handle.

7 Claims, 2 Drawing Sheets

GATE VALVE ACTUATOR

BACKGROUND OF THE INVENTION

This invention is related to an external actuator device which is attached to a recreational vehicle gate valve so that the user can open the valve by turning the actuator handle instead of pulling the gate valve handle.

Gate valves are commonly used to dump the holding tanks of recreational vehicles. Typically, the gate valve is mounted beneath the vehicle so that the user has to reach into a cramped area under the vehicle to reach the gate valve handle. The gate valve handle must be pulled in a linear motion in a location where there is little room for the arm motion necessary to properly manipulate the handle.

Actuators in the prior art which can be attached to a gate valve for assisting the user in opening the gate may be found in U.S. Pat. Nos. 4,875,504 which was issued Oct. 24, 1989 to Walter P. Nicholson for "Recreational Vehicle Gate Valve Actuator"; and 5,078,180 which was issued Jan. 7, 1992 to Richard Collins for "Automatically Operated Gate Valve for Recreational Vehicles".

Other prior art related to opening gate valves may be found in U.S. Pat. Nos. 3,316,929 which was issued May 2, 1967 to Kenneth A. Milette for "House Trailer Waste Outlet Gate Valve"; 1,801,237 which was issued Apr. 14, 1931 to Robert P. Hanson for "Gate Valve"; and 3,941,349 which was issued Mar. 2, 1976 to Michael L. Pierson for "Electromechanically Actuated Gate Valve Apparatus".

Usually such prior art actuators employ an electric motor or other power system for opening the valve.

SUMMARY OF THE INVENTION

The broad purpose of the present invention is to provide a mechanical actuator that can be easily mounted on a commercially-available gate valve to permit a rotatable actuator handle to open a linearly slidable gate.

The actuator has a support plate attached by the two screws normally employed for joining the gate valve housing to a pair of conduit-connecting flanges. A linkage, mounted on the support plate, is connected by a bracket to the gate valve handle. The actuator handle is mounted on the support plate and connected to the linkage so the user's thumb and index finger can turn the actuator handle to either expand the linkage to open the gate, or fold the linkage to close the gate. The preferred linkage is compact and has a sufficient mechanical advantage so that the user need apply a relatively small effort to open or close the gate valve.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
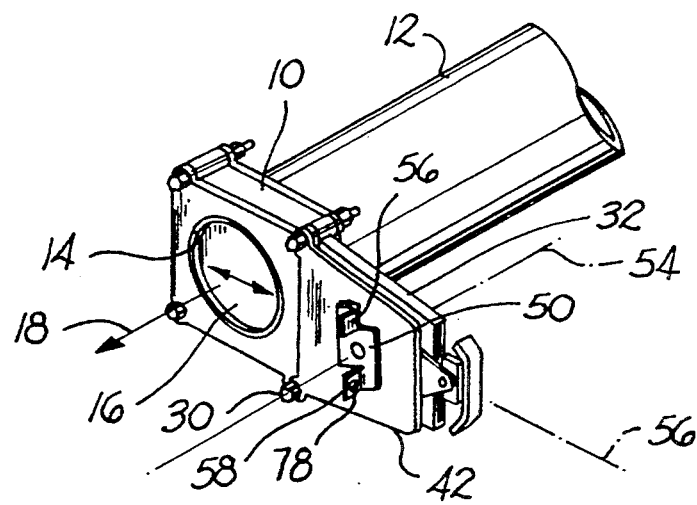
FIG. 1 is a fragmentary perspective view of a preferred actuator mounted on a commercially-available gate valve.

Referring to the drawings, a conventional, commercially-available gate valve 10 is illustrated connected to the drain conduit 12 of a recreational vehicle (not shown). The drain conduit is connected to a storage tank (not shown) for draining the tank. The gate valve has a valve opening 14 which is opened and closed by a sliding gate 16. When gate 16 is open, liquid flows from the conduit through opening 14 in a direction 18 toward an outlet conduit (not shown) in the manner well known to those skilled in the art.

Figure 2:
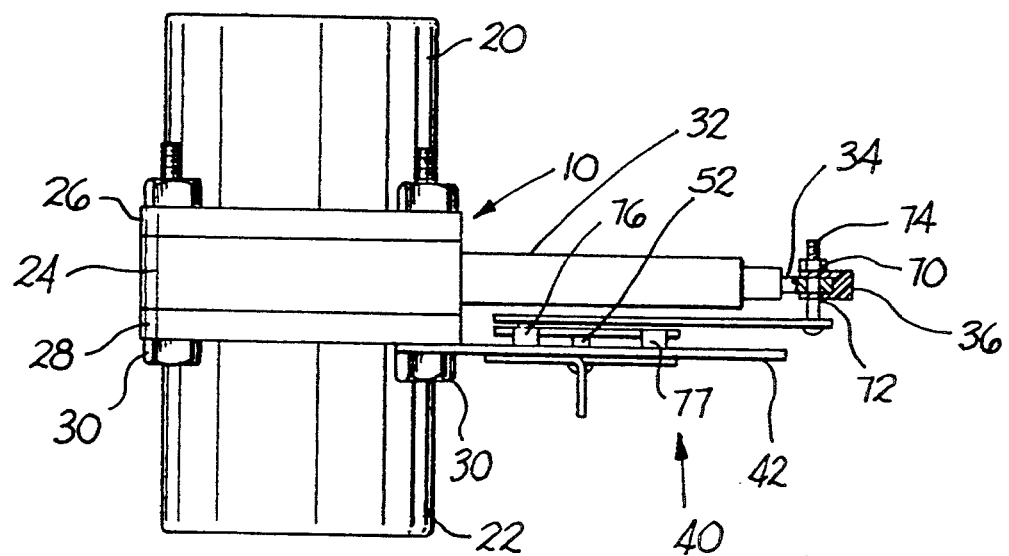
FIG. 2 is a plan view of the preferred actuator and gate valve.

Referring to FIG. 2, the gate valve has a cylindrical inlet collar 20 for connection to conduit 12, and a cylindrical outlet collar 22 for connection to the outlet conduit. The gate valve is preferable formed in three major sections which includes a central housing 24 which contains the gate valve opening and the gate, a flange 26 attached to collar 20 and a second flange 28 attached to collar 22. Nut and bolt fastener means 30 join the central housing and the two flanges together.

Central housing 24 includes a thin relatively wide housing 32 which contains a metal valve stem 34 which is attached to the gate. A handle 36 is carried on the outer end of stem 34 so that the user can open the gate by linearly pulling the handle toward the right, or close the gate by pushing the handle toward the left, as viewed in FIG. 3.

Up to this point, the description refers to the basic components of a typical commercially-available gate valve employed for recreational vehicles.

A preferred actuator, generally indicated at 40, is mounted on the gate valve and includes a steel support plate 42. Support plate 42 has a generally rectangular configuration and includes a pair of fastener openings 44 and 46. Plate 42 is mounted on the gate valve by the same nut and bolt fastener means 30 employed for joining flanges 26 and 28 to valve housing 24. The body of the support plate extends parallel to valve stem housing 32 and is spaced from the housing about ¾". Support plate is about 1/32" thick. The support plate is about 4½" wide and extends about 4½" from collar 22.

An actuator handle 50 is rotatably mounted on the support plate by a pivot 52, which may be a rivet. Handle 50 is rotatable about an axis which is parallel to axis 18, and is at right angles and generally intersects the linear axis of motion 56 of valve stem 34. Handle 50 is preferable formed of sheet metal with a pair of upturned wings 56 and 58. The wings are illustrated in phantom in FIG. 3 for descriptive purposes.

Figure 3:
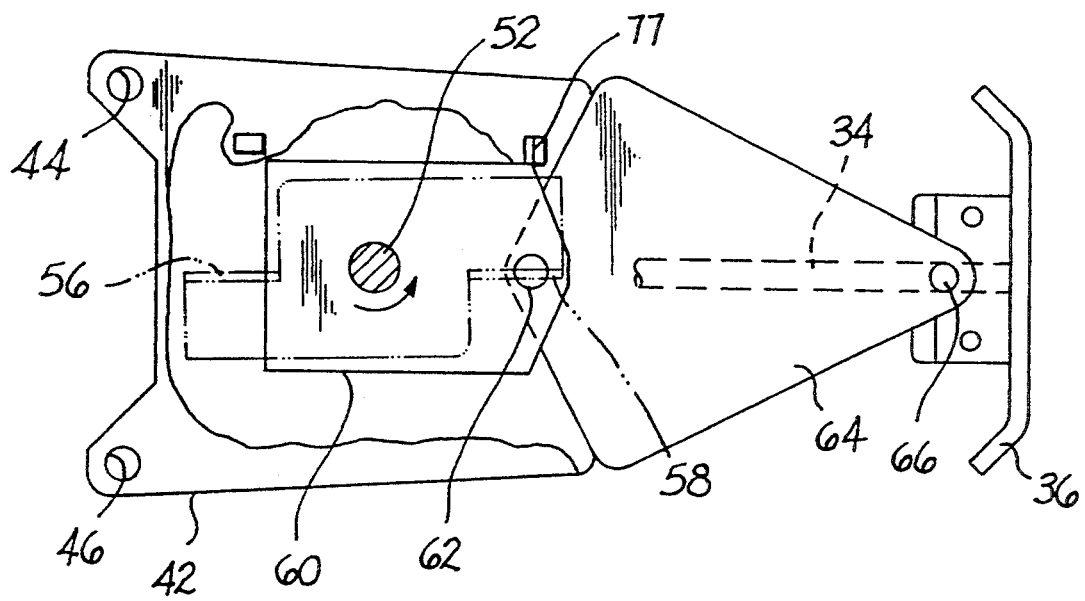
FIG. 3 is an enlarged fragmentary, elevational view of the preferred actuator with the gate valve in the open position.
Figure 4:
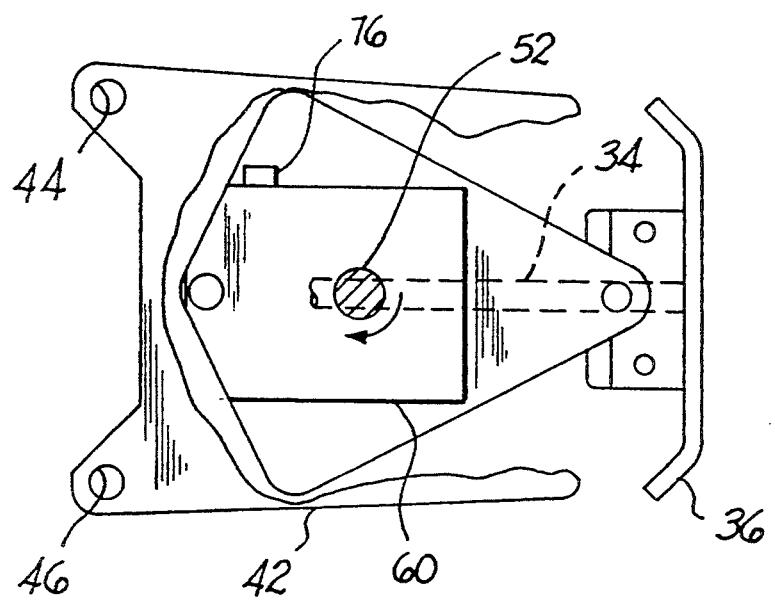
FIG. 4 is a view similar to FIG. 3, but with the gate valve handle in the closed position.

A sheet metal link 60 is mounted between the support plate and housing 32, and attached by pivot means 52 to the actuator handle so that link 60 rotates with the handle. Referring to FIGS. 3 and 4, link 60 carries a pivot member 62, which may be a rivet, in a position spaced about ½" from the pivotal axis of pivot 52. A second sheet metal link 64 is pivotally connected to pivot 62 so that link 60 can swing link 64 around pivot means 52 as the actuator handle is being turned. The two links partially overlap one another.

The outer end of link 62 carries a pivot 66 which may be a rivet. Pivot 66 is located about 4" from pivot 62.

Pivot 66 is mounted on valve stem handle 36 and valve stem 34 by a pair of small brackets 70 and 72 which, as best seen in FIG. 2, are clamped on opposite sides of the base of handle 36. Fastener means 74 join the brackets so that valve stem 34 and, in turn, the gate are moved as link 64 is moved by link 60.

The actuator handle may be turned from a position illustrated in FIG. 4, in which gate 16 is closed and link 60 abuts a tab 76 which is punched out of support plate 42 and limits the extreme clockwise motion of the actuator handle. In this position, the gate is fully closed. By rotating the actuator handle about its axis in the counter-clockwise direction, as viewed in FIG. 3, link 60 swings outwardly, moving link 64 outwardly and valve stem 34 toward the right, thereby opening the gate. The actuator handle is turnable about 180 degrees from the position illustrated in FIG. 4 in order to fully open the gate. Link 60 can then be moved slightly over center in the counter clockwise direction until it abuts a second tab 77 which is punched out of support plate 42, so as to prevent the valve from partially closing.

The mechanical advantage of the actuator handle permits the user to turn the handle by using his thumb and index fingers on wings 56 and 58, requiring a relatively minor physical motion as opposed to the effort and elbow room required to open the gate valve about 4" using only the commercially-available handle 36. The absence of the actuator handle requires the user to have sufficient space to not only grasp the handle, but, to align his arm with the valve stem for pulling the gate open or pushing it closed. The actuator handle permits the user to open the gate even though the handle is enclosed in a relatively closed area.

Wing 58 has a small opening 78 for attaching a remote control rod if the gate valve is located in a relatively inaccessible position, and must be opened and closed without requiring the user to enter the area beneath the vehicle.

Having described my invention, I claim:

1. An external actuator for manually operating a gate valve in a drainage line of a holding tank of a recreational vehicle, the gate valve having a housing and a linearly-sliding gate in the housing movable between open and closed positions, and an elongated valve stem attached to the gate valve to slide in a reciprocal path of motion along the longitudinal axis of the valve stem, the actuator comprising:

a support member comprising a plate supported adjacent and extending in a direction on the same side as and spaced from the valve stem;

means for fastening the support member to the gate valve housing;

linkage means including a first link and a second link extending along said support plate;

first connection means pivotally connecting the first link to the support plate;

second connection means pivotally connecting the second link to the valve stem;

third connection means pivotally connecting the first link to the second link such that the first link is pivotally moveable with respect to the second link extending along said support plate in a first direction for moving the valve stem and the gate valve toward a closed position, and moveable in the opposite direction for moving the valve stem and the gate valve toward an open position; and handle means mounted on said support plate and connected to the linkage means for manually turning the first link with respect to the second link causing the second link to move linearly for moving the gate between open and closed positions, the handle means including an actuator handle rotatable about an axis generally perpendicular to the support plate.

2. An actuator as defined in claim 1, in which the valve has a valve opening for passing a liquid along an axis of flow, and the actuator handle is rotatable about an axis parallel to the axis of the valve opening.

3. An actuator as defined in claim 1, in which the actuator handle is rotatable about an axis perpendicular to and generally intersecting the longitudinal axis of the valve stem.

4. An external actuator for manually operating a gate valve in a drainage line of a holding tank of a recreational vehicle, the gate valve having a housing and a linearly-sliding gate in the housing movable between open and closed positions, and an elongated valve stem attached to the gate valve to slide in a reciprocal path of motion along the longitudinal axis of the valve stem, the actuator comprising:

a support member extending in a direction on the same side as and spaced from the valve stem;

means for fastening the support member to the gate valve housing;

linkage means including a first link and a second link extending along the support member;

first connection means pivotally connecting the first link to the support member;

second connection means pivotally connecting the second link to the valve stem;

third connection means pivotally connecting the first link to the second link such that the first link is pivotally moveable with respect to the second link extending along the support member in a first direction for moving the valve stem and the gate valve toward a closed position, and moveable in the opposite direction for moving the valve stem and the gate valve toward an open position; and handle means mounted on the support member and connected to the linkage means for manually turning the first link with respect to the second link causing the second link to move linearly for moving the gate between open and closed positions, the handle means including an actuator handle which is rotatable about an axis perpendicular to and generally intersecting the longitudinal axis of the valve stem.

5. An external actuator for manually operating a gate valve in a drainage line of a holding tank of a recreational vehicle, the gate valve having a housing and a linearly-sliding gate in the housing moveable between open and closed positions, and an elongated valve stem attached to the gate valve to slide in a reciprocal path of motion along the longitudinal axis of the valve stem, the actuator comprising:

a support plate extending in a direction on the same side as and spaced from the valve stem;

means for fastening the support plate to the gate valve housing;

linkage means including a first link and a second link extending along the support plate;

first connection means pivotally connecting the first link to the support plate;

second connection means pivotally connecting the second link to the valve stem;

third connection means pivotally connecting the first link to the second link such that the first link is pivotally moveable with respect to the second link extending along the support plate in a first direction for moving the valve stem and the gate valve toward a closed position, and movable in the opposite direction for moving the valve stem and the gate valve toward an open position;

the first link is a plate like member supported adjacent to and parallel to the support plate;

the second link is a plate-like member supported adjacent to and parallel to the support plate; and handle means mounted on the support plate and connected to the linkage means for manually turning the first link with respect to the second link causing the second link to move linearly for moving the gate between open and closed positions, the handle means comprising a plate-like member having a midsection supported parallel to the support plate and including a pair of spaced wings on opposite sides of the first connection means for rotating the handle means about the first connection means.

6. An actuator as defined in claim 5, including a stop element on the support plate for engaging the first link when the gate value is fully closed.

7. An external actuator for manually operating a gate valve in a drainage line of a holding tank of a recreational vehicle, the gate valve having a housing and a linearly-sliding gate in the housing movable between open and closed positions, and an elongated valve stem attached to the gate valve to slide in a reciprocal path of motion along the longitudinal axis of the valve stem, the actuator comprising:

a support member extending in a direction on the same side as and spaced from the valve stem;

means for fastening the support member to the gate valve housing;

linkage means including a first link and a second link parallel to one another and extending along the support member;

first connection means pivotally connecting the first link to the support member;

second connection means pivotally connecting the second link to the valve stem;

third connection means pivotally connecting the first link to the second link such that the first link is pivotally moveable with respect to the second link in a first direction for moving the valve stem and the gate valve toward a closed position, and moveable in the opposite direction for moving the valve stem and the gate valve toward an open position;

handle means mounted on the support member and connected to the linkage means for manually turning the first link with respect to the second link causing the second link to move linearly for moving the gate between open and closed positions; and the first and second connection means being disposed adjacent the longitudinal axis of the valve stem, one of said links covering the other of said links in a first of said valve positions, and the third connection means being disposed such that the other of said links moves from behind said one of said links as the handle means is rotated.

* * * * *